United States Patent [19]

Hartman et al.

[11] Patent Number: 5,325,451
[45] Date of Patent: Jun. 28, 1994

[54] MODULAR OPTICAL WAVEGUIDE AND METHOD FOR MAKING

[75] Inventors: Davis Hartman, Phoenix; Michael S. Lebby, Apache Junction, both of Ariz.; Thomas H. Blair, Schaumburg; Dennis B. Miller, Barrington, both of Ill.

[73] Assignee: Motorola, Inc., Schaumburg, Ill.

[21] Appl. No.: 865

[22] Filed: Jan. 5, 1993

[51] Int. Cl.⁵ ............................................ G02B 6/36
[52] U.S. Cl. ........................................ 385/49; 385/50; 385/52; 385/89; 385/132
[58] Field of Search .............. 385/49, 14, 50, 132, 385/59, 71, 89, 52

[56] References Cited

U.S. PATENT DOCUMENTS

| | | | |
|---|---|---|---|
| 4,639,074 | 1/1987 | Murphy | 385/52 X |
| 4,653,852 | 3/1987 | Suzuki et al. | 385/114 X |
| 4,789,642 | 12/1988 | Lorenzo et al. | 385/132 X |
| 5,061,029 | 10/1991 | Ishikawa | 385/132 |
| 5,113,471 | 5/1992 | Inaishi et al. | 385/49 X |
| 5,136,678 | 8/1992 | Yoshimura | 385/132 |
| 5,166,998 | 11/1992 | Patel | 385/114 |

Primary Examiner—John D. Lee
Assistant Examiner—Hemang Sanghavi
Attorney, Agent, or Firm—Gary F. Witting; Eugene A. Parsons

[57] ABSTRACT

A method for making a modular optical waveguide (100) including a plurality of optical modules (102, 103, 104, 105) with each optical module having at least a core region (101) that is surrounded by a cladding region (111, 112). A first groove 114 and a second groove 116 are disposed into cladding region (111, 112), thereby separating the optical modules (102, 103, 104, 105).

13 Claims, 1 Drawing Sheet

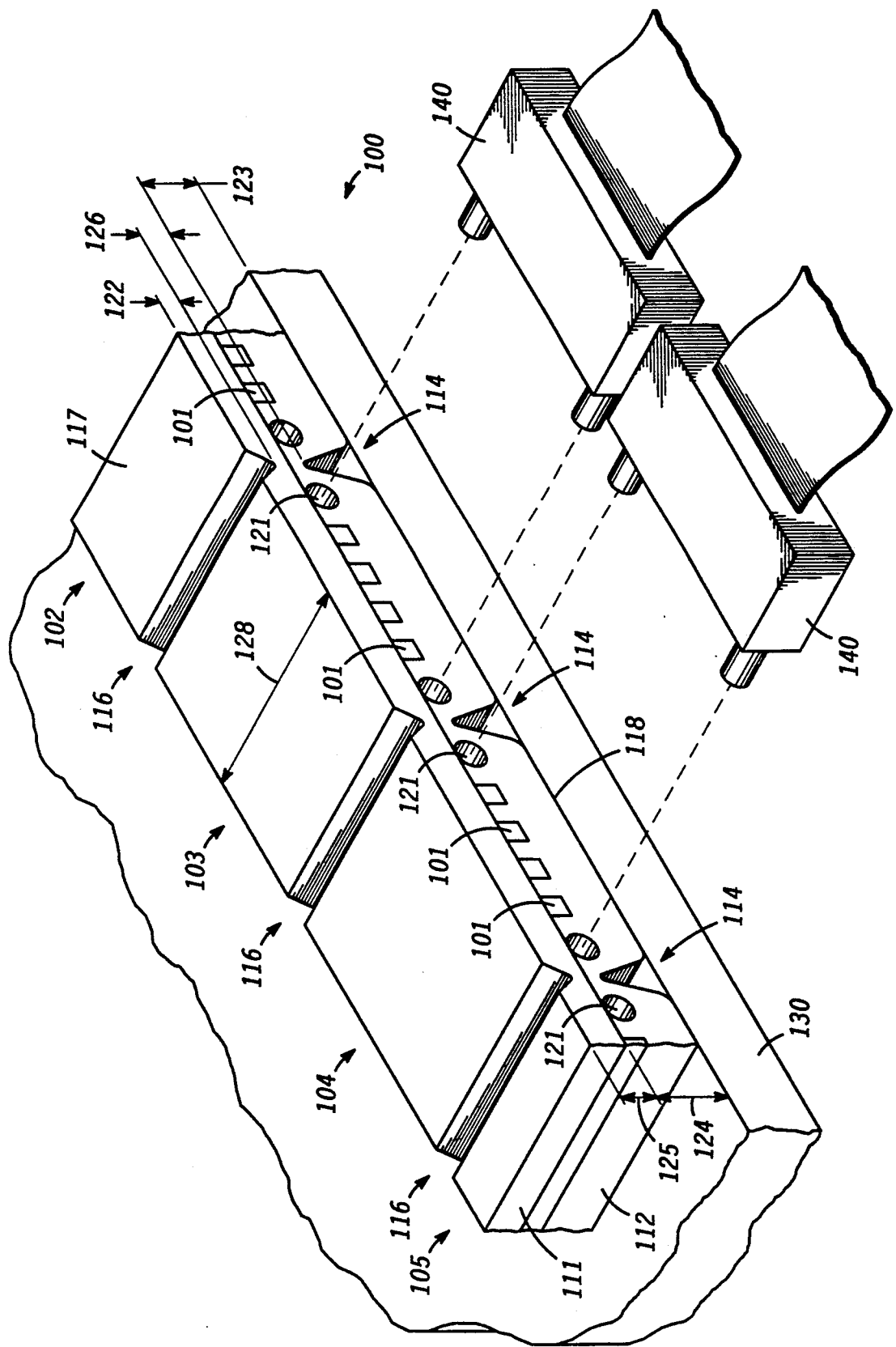

MODULAR OPTICAL WAVEGUIDE AND METHOD FOR MAKING

BACKGROUND OF THE INVENTION

This invention relates, in general, to fabrication of optical devices and, more particularly, to manufacturing and fabrication of optical waveguides.

This application is related to copending application that bears Ser. No. 07/889,335, titled MOLDED WAVEGUIDE AND METHOD OF MAKING SAME, filed on May 28, 1992 (now U.S. Pat. No. 5,265,184).

At present, optical waveguides are made in a variety of methods, such as photolithography, diffusion, ion implantation, or a combination of any of the above. Generally, these methods used for manufacturing waveguides are complex, inefficient, and are generally not suitable for high volume manufacturing. However, as use of optical waveguides increase, a need for a fabrication method and a structure that allows for efficient and cost effective manufacturing will be required.

Additionally, use of conventional methods for manufacturing waveguides do not provide sufficient flexibility for manufacturing multiple waveguides or modular waveguides, thereby making waveguides difficult to assimilate into standard electronic circuits and electronic components. As a result, these inflexible conventional methods limit use of waveguides for interconnection applications in standard electronic equipment, thus use of waveguides in high volume applications is severely curtailed.

Further, conventional methods for manufacturing waveguides required individual processing that is achieved by hand. Processing that is achieved by hand injects many problems into manufacturing, such as being extremely labor intensive, costly, accuracy of workmanship that result in waveguides not being allowed to be manufactured in high volume. Moreover, individual fabrication of waveguides do not readily lend itself to automated manufacturing, thus causing limited use of waveguides in electronic products.

It can be readily seen that conventional methods for manufacturing waveguides have severe limitations. Also, it is evident that conventional methods for manufacturing waveguides are not only ineffective, expensive, and complex, but also do not lend themselves to high volume manufacturing. Therefore, a method for manufacturing waveguides in an automatic effective manner would be highly desirable.

SUMMARY OF THE INVENTION

Briefly stated, an article and a method for making a modular optical waveguide are provided. A plurality of optical modules with each optical module having at least a core region that is surrounded by a cladding region, wherein the cladding region defines a first surface and second surface opposite to each other. A first groove is disposed into the first surface and a second groove is disposed into a second surface of the cladding region, wherein the first groove and second groove are spaced such that the core region of each optical module is separated by the first and the second groove.

BRIEF DESCRIPTION OF THE DRAWING

The sole FIGURE is a simplified enlarged partial perspective view of a modular optical waveguide.

DETAILED DESCRIPTION OF THE DRAWING

The sole FIGURE is an enlarged simplified partial perspective view of a modular optical waveguide 100. Modular optical waveguide 100 includes individual optical waveguide modules 102, 103, 104, and 105. Each optical waveguide module 102, 103, 104, and 105 is fabricated with at least a core region that is surrounded by a cladding region that forms a first surface 117 and a second surface 118 opposite to each other. However, in a preferred embodiment of the present invention, a plurality of core regions 101 is fabricated within each optical waveguide module 102, 103, 104, 104, or 105. Core regions 101 are surrounded by cladding regions 111 and 112 that form first surface 117 and second surface 118. However, it should be noted that cladding regions 111 and 112 are capable of being formed as a single cladding regions that surrounds core region 101, thus cladding regions 111 and 112 do not have to be made as two pieces.

Generally, both core regions 101 and cladding regions 111 and 112 are made of a hard optical transparent polymer, wherein core regions 101 have a higher refractive index than do cladding regions 111 and 112, thus allowing for efficient light confinement, efficient light transmission, and efficient internal reflection through core region 101. Commonly, there is a refractive index difference of at least 0.01 between core regions 101 and cladding regions 111 and 112. In addition, cladding regions 111 and 112 are capable of being made of a translucent material while maintaining an appropriate refractive index as described hereinabove. The translucent materials generally are made by an addition of fillers, such as silicas, silicates, or the like. Addition of these filler materials to the polymer material provides structural benefits, such as hardness, strength, rigidity, lowering the coefficient of expansion, durability to temperature cycling, and the like. In addition, modular optical waveguide 100 is made in accordance with copending application previously mentioned hereinbefore.

In the present invention, modular optical waveguide 100 is fabricated with any suitable number of individual optical waveguide modules, such as optical waveguide modules 102, 103, 104, and 105, that are detachably connected by grooves 114 and 116, thereby providing ability to generate any desirable length from modular optical waveguide 100. Typically, modular optical waveguide 100 is formed in long (continuous) lengths so as to facilitate use of modular optical waveguide 100 in robotic or automated manufacturing of many versions of different modular genres.

For example, with modular optical waveguide 100 being formed with forty optical waveguide modules. Modular optical waveguide 100 is loaded into a robotically controlled manufacturing system (not shown). Via a computer (not shown) that determines the desired length and that directs the robotically controlled manufacturing system, a robotic arm (not shown) cleaves modular optical waveguide 100 through grooves 114 and 116 to the desired length. The desired length is then placed onto a substrate 130 by the robotically controlled manufacturing system. However, a second substrate (not shown) corresponding to a different version of a different modular genre may require a different desired length from that of substrate 130. In response, the robotic arm simply cleaves a subsequent desired length from remaining portion of modular optical waveguide 100 to the desired length of the second substrate and places the desired length onto the second substrate.

In the present invention, modular waveguide 100 is made with indents or grooves 116 in surface 117 and with indents or grooves 114 in surface 118 that separate individual optical waveguide modules, such as optical waveguide modules 102, 103, 104, and 105. Further, grooves 114 and 116 traverse across width 128 of modular optical waveguide 100 such that grooves 114 and 116 are aligned and parallel. While grooves 114 and 116 are shown as V-grooves, other geometric configurations are capable of being made to form grooves 114 and 116, such as squared-off channels, U-grooves, beveled surfaces, or the like. In addition, grooves 114 and 116 are capable of being made such that other geometric designs (not shown) are capable of being placed into grooves 114 and 116. Placement of these geometric designs changes structural integrity of grooves 114 and 116, thereby increasing or decreasing grooves 114 and 116 ability to cleave or brake.

More specifically grooves 116 and 114 are made using a variety of fabrication methods, such as milling, chemical etching, molding, or the like. However, in a preferred embodiment of the present invention, grooves 116 and 114 are molded during fabrication of cladding regions 111 and 112 of modular waveguide 100 and are subsequently joined to form modular waveguide 100. Alignment of cladding regions 111 and 112 prior to joining is accomplished by an automatic system such as a robotic arm (not shown) with machine vision. However, it should be noted that other alignment systems are capable of being used as well. By molding grooves 114 and 116 during the fabrication of optical modular waveguide 100, an accurate and repeatable process is achieved which allows for automated manufacturing of modular waveguide 0, thus reducing cost and increasing accuracy of optical modular waveguide 100. Further, it should be understood that molding alignment guides 121 during the fabrication of cladding region 112 enables alignment guides 121 to take advantage of the accuracy and the repeatability of the molding process. Moreover, by molding long lengths of modular waveguide 100 and cleaving the required number of modules, a center to center spacing of alignment guides 121 is effectively and easily maintained, thus ensuring that connector cables 140 are easily inserted into alignment guides 121.

Grooves 114 and 116 are made with a specific depth illustrated by arrows 122 and 123, respectively. However, the specific depth of grooves of 114 and 116 is dependent upon several parameters, such as relative thicknesses of cladding regions 111 and 112, hardness of the material forming cladding regions 111 and 112, and the like. Therefore, it should be noted that depending upon choice of materials, design of modular optical waveguide 100, and manner of cleaving depth of grooves 114 and 116 are adjusted accordingly. However, a general ratio that ranges from 4:1 to 6:1 relates total depth of grooves 114 and 115 to thickness 126 that can be used for most materials used for making cladding regions 111 and 112.

By way of example only, with cladding regions 111 and 112 each being approximately one millimeter in thickness as illustrated by arrows 124 and 125 respectively. In accordance with the above stated ratio, thickness 126 is capable of ranging from 0.5 millimeter to 0.33 millimeter, thus depths 123 and 122 of grooves 114 and 116 if evenly split range from 1.5 millimeter to 1.67 millimeter. However, it should be understood that the total depth does not have to be evenly split between cladding regions 111 and 112. Uneven splits of the total depth are possible, as well as having the total depth being located in only one cladding region. In addition, it should be understood that cleaving along grooves 114 and 116 can be modified by a variety of structures as described hereinabove, thus enabling further customization of structural element so as to provide proper material characteristics for each specific application.

By now it should be appreciated that an article and method for making modular optical waveguides have been described. The method allows for a highly manufactureable and cost effective method that provides accurate cleaving of desirable lengths of modular optical waveguides effectively and repeatability. Further, this method allows for automated processing that further reduces cost.

We claim:

1. A modular optical waveguide comprising:
   a first optical portion having a first surface and a second surface opposite to each other, the first surface having a plurality of channels filed with an optical media and the second surface having a plurality of parallel grooves that traverse across a width of the first optical portion, thereby separating the plurality of channels into groups;
   a second optical portion having a first surface and a second surface opposite to each other, the first surface having a plurality of parallel grooves that traverse across a width of the second optical portion, wherein the second surface of the second optical portion and the first surface of the first optical portion are adhered together such that the plurality of parallel grooves of the first optical portion are aligned adjacent and parallel to the plurality of parallel grooves of the second optical portion, thereby facilitating cleaving of a desired length of a modular optical waveguide; and
   an alignment guide located between the parallel grooves of the first and second optical portions.

2. A modular optical waveguide as claimed in claim 1 wherein the first and the second optical portion are molded.

3. A modular optical waveguide as claimed in claim 1 wherein the optical media is an optical epoxy.

4. A detachable optical waveguide module comprising:
   a plurality of repeating optical waveguide modules with each of the plurality of repeating optical waveguide modules including a multitude of core channels surrounded by a cladding region, wherein the cladding region forms a first external surface and a second external surface that are parallel with the core regions therebetween;
   a plurality of grooves disposed into the first external surface of the cladding region that segments each individual waveguide module by having a first groove and a second groove of the plurality of grooves located along a width and in the cladding region to segment each multitude of core channels from each other;
   a plurality of grooves disposed into the second external surface that are aligned to the plurality of grooves disposed into the first external surface, thereby enabling a desired length to be detached from an optical waveguide module; and an alignment guide located between the first and the second plurality of grooves.

5. A detachable optical waveguide module as claimed in claim 4 wherein the optical waveguide module is molded.

6. A detachable optical waveguide module as claimed in claim 4 wherein the plurality of grooves on the first and second external surface is molded.

7. A detachable optical waveguide module as claimed in claim 4 wherein the plurality of grooves on the first and second external surface is machined.

8. A method for making a detachable optical waveguide module comprising the steps of:
   molding a first optical piece having a first external surface and a second external surface, the first external surface having repeating modules with each repeating module including a plurality of channels and a first and a second alignment guide with the first alignment guide located on a first side of the channels and the second alignment guide located on a second side of the channels, the second external surface having repeating parallel grooves traversing across a width of the second external surface
   molding a second optical piece having a first external surface and a second external surface with the first external surface of the second optical piece having a plurality of parallel grooves equidistantly spaced; and
   adhering the first external surface of the second optical piece of the first external surface of the first optical piece with an optically clear adhesive, wherein the plurality of grooyes of the first optical piece is aligned to the second optical piece, thereby enabling alignment of the optical waveguide module.

9. A method for making a detachable optical waveguide module as claimed in claim 8 wherein the step of adhering of the first surface of the second optical piece to the first surface of the first optical piece is achieved with an epoxy.

10. A method for making a detachable optical waveguide module as claimed in claim 8 further comprising the step of molding an alignment guide into the first surface of the first optical piece.

11. A method for making a detachable optical waveguide module as claimed in claim 8 further comprising the step of detaching the desired number of optical modules by cleaving the optical waveguide at appropriate aligned grooves.

12. A modular optical waveguide comprising:
    a plurality of optical modules each module having a core region surrounded by a cladding region, wherein the cladding region provides a first and a second external surface opposite to each other;
    a first groove and a second groove disposed into the first and the second external surfaces of the cladding regions separating the plurality of optical modules, wherein the first and the second groove are space such that the core region of each optical module is between the first groove and the second groove; and
    an alignment guide located in the cladding region.

13. A modular optical waveguide comprising:
    a plurality of optical modules each module having a core region surrounded by a cladding region, wherein the cladding region provides a first exterior surface and a second exterior surface opposite to each other;
    at least a groove disposed into one of the first and the second exterior surfaces, thereby allowing a predetermined length of optical modules to be detached; and
    an alignment guide located in at least one of the plurality of optical modules.

* * * * *